United States Patent [19]

Seneker et al.

[11] Patent Number: 5,576,382
[45] Date of Patent: Nov. 19, 1996

[54] AQUEOUS POLYURETHANE DISPERSIONS BASED ON POLYETHER POLYOLS OF LOW MONOL CONTENT

[75] Inventors: Stephen D. Seneker, Sissonville; Nigel Barksby, Dunbar, both of W. Va.

[73] Assignee: Arco Chemical Technology, L.P., Greenville, Del.

[21] Appl. No.: 437,341

[22] Filed: May 5, 1996

[51] Int. Cl.$^6$ .................. C08J 3/00; C08K 3/20; C08L 75/00
[52] U.S. Cl. .................. 524/591; 524/538; 524/839; 524/840; 528/60
[58] Field of Search .................. 528/60; 524/591, 524/538, 839, 840

[56] References Cited

U.S. PATENT DOCUMENTS

| | | | |
|---|---|---|---|
| 3,238,010 | 3/1966 | Habib et al. | 8/115.6 |
| 3,427,256 | 2/1969 | Milgrom | 252/431 |
| 3,427,334 | 2/1969 | Belner | 260/429 |
| 3,427,335 | 2/1969 | Herold | 260/429 |
| 3,479,310 | 11/1969 | Dieterich | 260/29.2 |
| 3,829,505 | 8/1974 | Herold | 260/611 |
| 3,941,849 | 3/1976 | Herold | 260/607 |
| 4,183,836 | 1/1980 | Wolfe, Jr. | 260/29.2 |
| 4,203,883 | 5/1980 | Hangauer, Jr. | 524/591 |
| 4,239,879 | 12/1980 | Fabris et al. | 528/76 |
| 4,242,490 | 12/1980 | Emerson et al. | 528/77 |
| 4,408,008 | 10/1983 | Markusch | 524/591 |
| 4,477,589 | 10/1984 | van der Hulst et al. | 502/169 |
| 4,507,430 | 3/1985 | Shimada et al. | 524/839 |
| 4,595,743 | 6/1986 | Laughner et al. | 528/73 |
| 4,687,851 | 8/1987 | Laughner | 544/398 |
| 4,985,491 | 1/1991 | Reisch | 524/875 |
| 5,010,117 | 4/1991 | Herrington et al. | 521/159 |
| 5,093,380 | 3/1992 | Takeyasu et al. | 521/131 |
| 5,096,993 | 3/1992 | Smith et al. | 528/61 |
| 5,100,922 | 3/1992 | Wada et al. | 521/51 |
| 5,100,997 | 3/1992 | Reisch et al. | 528/60 |
| 5,106,874 | 4/1992 | Porter et al. | 528/64 |
| 5,116,931 | 5/1992 | Reisch et al. | 528/59 |
| 5,124,425 | 6/1992 | Higuchi et al. | 528/59 |
| 5,136,010 | 8/1992 | Reisch et al. | 528/75 |
| 5,145,883 | 9/1992 | Saito et al. | 521/172 |
| 5,158,922 | 10/1992 | Hinney et al. | 502/175 |
| 5,185,420 | 2/1993 | Smith et al. | 528/61 |
| 5,248,833 | 9/1993 | Hinney et al. | 568/621 |
| 5,250,582 | 10/1993 | Hire et al. | 521/157 |
| 5,298,572 | 3/1994 | Katz | 525/419 |
| 5,300,535 | 4/1994 | Takeyasu et al. | 521/137 |
| 5,340,902 | 8/1994 | Smith et al. | 528/61 |

FOREIGN PATENT DOCUMENTS 4145123  5/1992  Japan.

OTHER PUBLICATIONS

"Hexacyanometalate Salt Complexes as Catalysts for Epoxide Polymerizations", R. J. Herold and R. A. Livigni *Advances in Chemistry Series* No. 128, Polymerization Kinetics and Technology (1973), pp. 208–229.

"Preparation of High Molecular Weight Polyols Using Double Metal Cyanide Catalysts", J. L. Schuchardt and S. D. Harper, *32nd Ann. Polyurethane Technical/Marketing Conference*, Oct. 1–4, 1989, pp. 360–363.

"Urethane Applications for Novel High Molecular Weight Polyols", R. L. Mascioli, *32nd Ann. Polyurethane Technical/Marketing Conference*, Oct. 1–4, 1989 pp. 139–142.

(List continued on next page.)

*Primary Examiner*—Paul R. Michl
*Assistant Examiner*—Patrick Niland
*Attorney, Agent, or Firm*—Dennis M. Kozak

[57] ABSTRACT

Aqueous polyurethane dispersions prepared from chain extended polyurethane prepolymers which are the reaction product of a di- or polyisocyanate, a polyol component containing, in major part, a polyoxypropylene diol having an unsaturation of 0.020 meq/g or less, and a reactive dispersing aid, are suitable for preparing polyurethane films with greater softness and elasticity than similar films prepared from PTMEG, and greater tensile strength and elasticity than polyoxypropylene diols having conventional levels of unsaturation.

20 Claims, 1 Drawing Sheet

OTHER PUBLICATIONS

"Polyurethane Sealants and Cast Elastomers with Superior Physical Properties", J. W. Reisch and D. M. Capone, *33rd Ann.Polyurethane Technical/Marketing Conference,* Sep. 30–Oct. 3, 1990, pp. 368–374.

"Thermoplastic Polyurethane Elastomers Made from High Molecular Weight POLY–L™ Polyols", C. P. Smith, et al, *Polyurethanes World Congress 1991,* Sep. 24–26, 1991 pp. 313–318.

"Comparison of the Dynamic Properties of Polyurethane Elastomers, etc.", A. T. Chen, et al, *Polyurethanes World Congress 1993,* Oct. 10–13, 1993 pp. 388–399.

Odian, *Principles of Polymerization,* 1981, pp. 20–21, John Wiley & Sons.

*Fig. 1*

AQUEOUS POLYURETHANE DISPERSIONS BASED ON POLYETHER POLYOLS OF LOW MONOL CONTENT

TECHNICAL FIELD

The present invention pertains to aqueous polyurethane dispersions (lattices). More particularly, the present invention pertains to aqueous polyurethane dispersions exhibiting unusually low hardness and high elasticity prepared from polyoxyalkylene polyols having low monol content. The polyurethane dispersions are suitable for forming flexible films and coatings.

BACKGROUND ART

Polyurethane coatings are by now well known. For example, polyurethane varnishes exhibit excellent resistance to water and solvents, and are widely used in finishing articles of wood, metal, and plastic. However, such varnishes are solvent-borne, and the introduction of solvent into the air by evaporation is environmentally undesirable. Many states have enacted legislation limiting VOC (volatile organic compounds) emissions in industrial processes, and this ban has had an effect even on home use of such products. As a result, there is a great interest in solvent-free compositions or aqueous compositions where only water is evolved upon drying.

Aqueous polyurethane lattices have been developed which offer excellent film forming capabilities. Such lattices are typically dispersions of polyurethane/ureas in water. Presently available polyurethane dispersions offer relatively long shelf life, but the range of hardness and flexibility is limited. For example, in textile applications, solvent borne polyurethane lacquers are still predominant, as aqueous dispersions have not provided the degree of softness and elasticity required to prepare textiles having aesthetic hand and drape.

Polyurethane lattices are generally prepared by the reaction of excess di- or polyisocyanate with a hydroxyl-functional polyol in the presence of reactive compounds capable of providing a degree of hydrophilic character to the prepolymer thus formed. The reactive compound may contain cationic or anionic groups or non nonionic hydrophilic groups such as polyoxyethylene groups. The prepolymer is then dispersed in water, either neat or dissolved in solvent. This dispersion is then reacted in situ with a chain extender, generally a diamine, triamine, or the like, to form a stable, aqueous polyurethane/urea latex. If solvent is utilized, it is then stripped off, leaving an aqueous dispersion. The charged or hydrophilic groups in the prepolymer are necessary in order to effect long term stability to the dispersion, which otherwise might settle or coagulate.

Among the hydroxyl-functional polyols utilized to form the isocyanate-terminated polyurethane prepolymer are polyester polyols such as polybutylene adipate and polycaprolactone diols, polyoxytetramethylene ether glycols (PTMEG), polyoxyethylene diols and polyoxypropylene diols. If a minor degree of crosslinking is desired, a trifunctional polyol such as a trimethylol propane or glycerine initiated polyoxyalkylene polyol may be added. Increased hardness may be achieved through addition of a low molecular weight glycol, for example ethylene glycol or neopentyl glycol.

Polyoxytetrmethylene ether glycols (PTMEG) are preferred in some applications, as the cured films possess a desirable combination of properties, for example excellent hydrolyric stability and microbial resistance, in comparison to films prepared from similar molecular weight polyesters. PTMEG is, however, a premium cost raw material. Moreover, films formed even from PTMEG-based lattices are deficient in flexibility and elongation for many applications. Polyurethane lattices have also been prepared from conventional polyoxypropylene diol-based prepolymers. However, films prepared from such prepolymers have inferior tensile strength and elongation, and have a tendency to be tacky in comparison to their PTMEG analogs. Applications of such polyurethane dispersions are therefore limited to uses where cost rather than performance is the driving factor. Thus, it would be desirable to be able to provide low cost polyurethane dispersions with flexibility, elongation, and other physical properties which equal or exceed those of lattices based on PTMEG derived prepolymers.

SUMMARY OF THE INVENTION

It has now been surprisingly discovered that polyurethane dispersions prepared from isocyanate-terminated prepolymers derived from a polyol component comprising in major part one or more polyoxypropylene diols having an unsaturation of less than 0.02 meq/g polyol, and preferably less than 0.010 meq/g polyol, have exceptional physical properties as compared to otherwise similar lattices where the polyol component is a conventional polyoxypropylene diol of higher unsaturation, or PTMEG. The lattices of the subject invention extend the application of polyurethane dispersions into fields where their performance was previously inadequate.

DESCRIPTION OF THE PREFERRED EMBODIMENTS

The polyurethane dispersions of the subject invention are prepared by conventional methods, preferably by the preparation of an isocyanate-terminated prepolymer containing hydrophilic dispersing groups followed by dispersion of the prepolymer into water. A chain extending agent is then added to form a high solids, stable dispersion. It is critical, during prepolymer formation, to utilize as the polyoxypropylene diol, a low unsaturation polyoxypropylene diol having a low monol content.

By the-term "polyurethane" is meant a polymer whose structure contains predominately urethane linkages between repeating units. Such linkages are formed by the addition reaction between an organic isocyanate group R—[—NCO] and an organic hydroxyl group [HO—]—R. In order to form a polymer, the organic isocyanate and hydroxyl group-containing compounds must be at least difunctional. However, as modernly understood, the term "polyurethane" is not limited to those polymers containing only urethane linkages, but includes polymers containing allophanate, biuret, carbodiimide, oxazolinyl, isocyanurate, uretidinedione, urea, and other linkages in addition to urethane. The reactions of isocyanates which lead to these types of linkages are summarized in the POLYURETHANE HANDBOOK, Gunter Vertel, Ed., Hanser Publishers, Munich, ®1985, in Chapter 2, p. 7–41; and in POLYURETHANES: CHEMISTRY AND TECHNOLOGY, J. H. Saunders and K. C. Frisch, Interscience Publishers, New York, 1963, Chapter III, pp. 63–118. In addition to polyols (polyhydroxyl-containing monomers), the most common isocyanate-reactive monomers are amines and alkanolamines. In these cases, reaction of the amino group leads to urea linkages interspersed within the polyurethane structure.

Polyoxypropylene polyols are conventionally prepared by the base-catalyzed oxypropylation of a suitable initiator molecule, in the case of polyoxypropylene diols generally by oxypropylation of a dihydroxy functional initiator such as ethylene glycol, propylene glycol, 1,4-butane diol, or the like. The oxyalkylation proceeds together with a competing reaction/rearrangement to form allyloxy species which, upon oxyalkylation, in turn, form allyloxy-terminated polyoxypropylene monols. The mechanism of this competing reaction are discussed in BLOCK AND GRAFT POLYMERIZATION, Vol. 2, Ceresa, Ed., John Wiley & Sons, on ages 17–21. As oxypropylation proceeds, the formation of monofunctional allylic species increases. The reaction soon reaches the point where further increase in the molecular weight of the desired polyoxypropylene diol is outstripped by the formation of unsaturated monol. As a result, the practical upper limit for polyoxypropylene polyol equivalent weight is approximately 2000 Da. At this equivalent weight, the unsaturation, measured in accordance with ASTM D2849–69, "Testing Urethane Foam Polyol Raw Materials", indicates a monol content approaching 50 mole percent. The functionality of the polyoxypropylene diol is lowered from the theoretical value of 2 to values in the range of 1.4 to 1.6.

The unsaturation, and hence monol content, can be lowered somewhat by lowering the oxypropylation reaction temperature and catalyst level. Unfortunately, the improvement is only marginal, and further results in increased process time, significantly increasing the cost of the product. Catalysts other than traditional basic potassium or sodium hydroxide or alkoxide catalysts have been proposed, with some improvement resulting therefrom. Use of catalysts such as the flammable and toxic diethylzinc, or combinations of metal naphthenates and tertiary amines have been used to lower unsaturation. However, the resulting polyols still have considerable monol content.

Recently, complex catalysts based on double metal cyanides (DMC) have been used to prepare low unsaturation polyols. Although the basic DMC catalysts were proposed in the 1960's, as evidenced by U.S. Pat. No. 3,427,256; 3,427,334; 3,427,335; 3,829,505; and 3,941,849, their commercial use has been thwarted by a number of problems including difficulty of catalyst removal from the polyol product. More recently, glyme complexes of zinc hexacyanocobaltate (DMC glyme), as illustrated by U.S. Pat. No. 5,158,922 have been used to prepare polyoxypropylene polyols with measured unsaturations in the range of 0.015–0.018 meq/g. Oxyalkylation in the presence of non-reactive solvents have been used to further lower the unsaturation, but the solvent must then be stripped from the product. Most recently, and as disclosed in copending U.S. patent application Ser. No. 08/156,534, novel, substantially amorphous t-butylalcohol complexes of zinc hexacyanocobaltate (DMC.TBA) have been used to produce polyoxyalkylene polyols with unsaturations in the range of 0.003 to 0.007 meq/g. Although the ultra-low but measurable unsaturation implies a finite monol content, gel permeation chromatography shows the polyols to be monodisperse with no detectable lower molecular weight components which would be attributed to monol formation.

Numerous patents have addressed the use of higher molecular weight polyols to prepare polyurethanes. In such cases, the improvements are said to result either solely from the ability to provide higher molecular weight polyols of useful functionality, or additionally, the low monol content, the monol thought to react as "chain-stoppers" during polyurethane addition polymerization. Illustrative examples of such patents are U.S. Pat. No. 5,124,425 (room temperature cure sealants from high molecular weight polyols having less than 0.07 meq/g unsaturation); U.S. Pat. No. 5,100,997 (diamine extended polyurethane/urea elastomers from high molecular weight polyols having less than 0.06 meq/g unsaturation); U.S. Pat. No. 5,116,931 (thermoset elastomers from double metal cyanide catalyzed polyols having less than 0.04 meq/g unsaturation); U.S. Pat. No. 5,250,582 (high molecular weight DMC.glyme catalyzed polyols grafted with unsaturated polycar- boxylic acids to provide in situ blowing agent); U.S. Pat. No. 5,100,922 (high molecular weight polyols, preferably DMC.glyme catalyzed, together with aromatic crosslinking agent useful in preparing integral skin foams); U.S. Pat. No. 5,300,535 (high molecular weight polyols with unsaturation less than 0.07 meq/g useful in preparing foams with low resonant frequencies for seating applications); and U.S. Pat. No. 4,239,879 (elastomers based on high equivalent weight polyols). However, none of these patents pertain to aqueous polyurethane latex.

C. P. Smith et al., in "Thermoplastic Polyurethane Elastomers Made From High Molecular Weight Poly-L™ Polyols", POLYURETHANES WORLD CONGRESS 1991, September 24–26, 1991, pp. 313–318, discloses thermoplastic elastomers (TPU) prepared from polyoxyethylene capped polyoxypropylene diols with unsaturation in the range of 0.014–0.018 meq/g. An additional example of low unsaturation polyols, in polyurethane cast elastomers, is given in "Comparison of the Dynamic Properties of Polyurethane Elastomers Based on Low Unsaturation Polyoxypropylene Glycols and Poly(tetramethylene oxide) Glycols", A. T. Chen et al., POLYURETHANES WORLD CONGRESS 1993, October 10–13, 1993, pp. 388–399. Cited as positively influencing elastomer physical properties were the low monol content and low polydispersity of the c.a. 0.015 meq/g, DMC.glyme catalyzed polyols used.

High molecular weight, low unsaturation polyols are not merely "drop-in" replacements for conventional polyols, however. For example, use of a 10,000 Da low unsaturation triol in place of a conventional 5000 Da triol resulted in a polyurethane foam which was stiff and boardy rather than softer, as would be expected. Preparation of a soft foam based on the high molecular weight, low unsaturation polyol required changing the formulation in addition to adjusting the amount of isocyanate to maintain the same index. R. L. Mascioli, "Urethane Applications for Novel High Molecular Weight Polyols", 32ND ANNUAL POLYURETHANE TECHNICAL/MARKETING CONFERENCE, October 1–4, 1989. In similar fashion, the 10,000 Da polyol produced elastomeric polyurethanes with greater hardness than conventionally catalyzed 5000 Da polyols, where softer elastomers would be expected. Thus, it is difficult to accurately predict what effect substitution of low unsaturation polyols for conventional polyols will have on the physical properties of polyurethanes prepared from them.

The polyoxypropylene diols of the subject invention have equivalent weights of from 1000 Da to 8000 Da, preferably 1000 Da to 4000 Da, more preferably 1000 Da to 3000 Da, and most preferably 1000 Da to 2000 Da, and measured unsaturations less than 0.020 meq/g, preferably about 0.015 meq/g or less, more preferably less than 0.010 meq/g, and most preferably in the range of 0.001 to 0.007 meq/g. Such polyoxypropylene polyols may be prepared by DMC.glyme catalysis, but preferably, by substantially amorphous DMC.TBA catalysis. The actual method of catalysis is not important; the critical feature in the low unsaturation of less than 0.02 meq/g. Equivalent and molecular weights expressed in Da (Daltons) are number average equivalent and molecular weights.

The low unsaturation polyoxypropylene diols should comprise a major portion, i.e. greater than 50 weight percent, preferably greater than 80 weight percent, of the polyol component used to prepare the isocyanate-terminated prepolymer, and substantially all of the total polyoxypropylene polyol portion of the polyol component should be a low unsaturation polyol such that the total polyol component unsaturation is less than 0.020 meq/g. By the term "polyol component" is meant that portion of the isocyanate-reactive ingredients which is exclusively hydroxyl-functional and is used to form the prepolymer, other than reactive dispersing aids. Thus, the polyol component may include minor amounts of hard-segment producing diols, for example, ethylene glycol, propylene glycol, 1,2- and 1,4-butanediol, 1,6-hexanediol, 1,4-cyclohexanediol, 1,4-cyclohexanedimethanol, 4,4'-dihydroxybihenyl, hydroquinone, bisphenol A, bisphenol F, bisphenol S, neopentyl glycol, 2,2,4-trimethylpentanediol, and polyoxyalkylene oligomers with molecular weights of less than about 300 Da. Mixtures of these low molecular weight species may also be used.

The polyol component may further include a minor amount of other high molecular weight diols such as polyester diols, polytetramethylene ether glycols (PTMEG), and the like, provided that any monol content of such diols is low, such that the total monol content of the polyol component is below that corresponding to a polyoxyalkylene polyol unsaturation of 0.020 meq/g, preferably below that corresponding to 0.010 meq/g.

The isocyanates useful in the preparation of the subject polyurethane dispersions may, in general, be any organic di- or polyisocyanate, whether aliphatic or aromatic. However, preferred isocyanates are the commercially available isocyanates toluene diisocyanate (TDI), methylenediphenylene diisocyanate (MDI), and their alicyclic saturated analogs. Toluene diisocyanate is generally used as an 80:20 mixture of 2,4- and 2,6-TDI, although other mixtures such as the commercially available 65:35 mixture as well as the pure isomers are useful as well. Methylenediphenylene diisocyanate may also be used as a mixture of 2,4'-, 2,2'-, and 4,4'-MDI isomers. A wide variety of isomeric mixtures are commercially available. However, most preferable is 4,4'-MDI or this isomer containing minor amounts of the 2,4'- and 2,2'-isomers. Preferred aliphatic isocyanates are the linear alkylene diisocyanates such as 1,6-diisocyanatohexane, 1,8-diisocyanatooctane, and linear diisocyanates having interspersed heteroatoms in the alkylene residue, such as bis(3-isocyanatopropyl)ether. More preferred aliphatic isocyanates are the various cycloaliphatic isocyanates such as those derived from hydrogenated aryldiamines such as toluene diamine and methylenedianiline. Examples are 1-methyl-2,4-diisocyanatocyclohexane and 1-methyl-2,6-diisocyanatocyclohexane; bis(4-isocyanatocyclohexyl)methane and the isomers thereof; 1,2-, 1,3-, and 1,4-bis(2-(2-isocyanato propyl))benzene; and isophorone diisocyanate.

Modified isocyanates based on TDI and MDI are also useful, and many are commercially available. To increase the storage stability of MDI, for example, small quantities, generally less than one mole of an aliphatic glycol or modest molecular weight polyoxyalkylene glycol or triol may be reacted with 2 moles of diisocyanate to form a urethane modified isocyanate. Also suitable are the well known carbodiimide, allophanate, uretonimine, biuret, and urea modified isocyanares based on MDI or TDI. Mixtures of diisocyanates and modified diisocyanates may be used as well.

The isocyanate should be present in an amount sufficient to ensure isocyanate-termination of the prepolymer. The ratio of isocyanate groups to isocyanate-reactive groups contained in the polyol component, dispersing aid component, and any other reactive components present during prepolymer formation should, in general, range from 1.1 to 4, preferably 1.5 to 2.5, and more preferably 1.5 to 2.2 on an equivalent basis. The resulting prepolymers should desirably have isocyanate group (NCO) contents of between 1 and 8 weight percent, preferably 1 to 5 weight percent, based on the weight of the prepolymer. Prepolymer formation may be conducted neat or in non-reactive solvent, generally an aprotic water soluble or water miscible solvent such as dimethylformamide, N-methyl-2pyrrolidone, tetrahydrofuran, methylethylketone, acetone, and the like. For low VOC lattices, the solvent should be removed prior to or after dispersion in water. Reaction temperatures below 150° C., preferably between 50 and 130° C. are suitable. The reaction may be catalyzed by known catalysts, for example tin(II) octoate, dibutyltin dilaurate, dibutyltin diacetate, and the like, in amounts of 0.001 to about 0.1 weight percent, preferably 0.005 to 0.05 weight percent based on the weight of the prepolymer. Other catalysts are suitable as well.

For a stable latex dispersion, the prepolymer should contain one or more dispersing aids. The dispersing aid component may comprise a single dispersing aid or a mixture of one or more compatible dispersing aids, at least one of which must be reactive with the isocyanate component or the polyol component, preferably the former, and is considered when calculating the equivalent ratio of NCO-groups to NCO-reactive groups. In general, for example, the use of both cationic and anionic group-containing dispersing aids is not recommended, as these groups may inter-react, resulting in flocculation, coagulation, or precipitation of the prepolymer from the dispersion. Anionic and hydrophilic dispersing aids are preferred. Examples of suitable anionic dispersing aids, preferably containing carboxylate or sulfonic acid groups, as well as cationic quaternary nitrogen groups or sulfonium groups, are disclosed in U.S. Pat. Nos. 3,479,310; 4,108,814; and 3,419,533. Preferred, however are hydroxycarboxylic acids having the formula $(HO)_xR-(COOH)_y$ where R represents an organic residue and x and y both represent values of 1–3. Examples include citric and tartaric acid. However, the preferred dispersing aids are $\alpha,\alpha$-dimethylolalkanoic acids such as $\alpha,\alpha$-dimethylolacetic acid, and in particular, $\alpha,\alpha$-dimethylolpropionic acid. Polymers containing ionic groups or latent ionic groups and having isocyanate-reactive groups are also suitable. Examples include vinyl copolymers containing residues of acrylic acid and hydroxyethylacrylate or other hydroxyl-functional vinyl monomers.

Hydrophilic dispersing aids, as defined herein, are those non-ionic groups which impart hydrophilic character. Such groups may include oligomeric polyoxymethylene groups or preferably, polyoxyethylene groups. Particularly preferred are monofunctional polyoxyethylene monols or copolymer monols based on ethylene oxide and propylene oxide where a major portion of the oxyalkylene moieties are oxyethylene such that the monol as a whole is hydrophilic. Other hydrophilic, non-ionic polymers containing isocyanate reactive groups are useful as well. When hydrophilic, monofunctional dispersing aids are utilized, the isocyanate component may advantageously contain higher functional isocyanates such as the polymethylene polyphenylene polyisocyanates with functionalities between 2 and 2.4. Alternatively, the amount of diisocyanate may be increased and minor quantities of low molecular weight, isocyanate reactive, polyfunctional species such as glycerine, trimethylolpropane, diethanolamine, triethanolamine and the like, generally considered in polyurethane chemistry as cross-linking agents, may be added to counteract the chain blocking effect of monofunctional monols. However, addition of polyfunctional species is known to sacrifice some properties.

The dispersing aid component, containing one or more dispersing aids, may be added to the prepolymerforming ingredients during prepolymer formation, thus being randomly incorporated into the prepolymer molecular structure, or may be added following the reaction of the di- or polyisocyanate with the polyol component. Cross-linking agents, as described previously, may also be added simultaneously or subsequently. Alternatively, when two or more dispersing aids are present in the dispersing aid component, one dispersing aid or a portion of the mixture of two or more dispersing aids may be added during prepolymer formation with the remainder added following prepolymer formation. Regardless of when the dispersing aids are added, the resulting dispersing aid-containing prepolymer should retain isocyanate-reactive functionality.

The prepolymer thus formed may be dispersed in water by any known method, for example by adding water with stirring until phase inversion occurs, but preferably by adding the prepolymer, either neat or dissolved in solvent, to water with vigorous stirring.

Either before or after the prepolymer has been dispersed, latent cationic or anionic groups, preferably anionic dispersing groups, are advantageously converted to the corresponding anion or cation, for example, conversion of carboxylic acid groups to carboxylate groups. Conversion of carboxylic acid groups to carboxylate groups may be accomplished by addition of a neutralizing agent, for example a tertiary amine such as triethylamine.

Following preparation of the prepolymer dispersion and conversion of all or a portion of latent ionic groups to ionic groups, the chain extender is added to the dispersion. The chain extender may be one of the known glycol chain extenders, but is preferably an amine-functional or hydroxylamine-functional chain extender. The chain extender may be added to the water before, during or after dispersing the prepolymer. If the chain extender is added after dispersing the prepolymer, then it should be added before the prepolymer has an opportunity to significantly react with water, normally within 30 minutes, preferably 15 minutes.

The amine chain extender is preferably a polyfunctional amine or a mixture of polyfunctional amines. The average functionality of the amine, i.e., the number of amine nitrogens per molecule, should be between about 1.8 and 6.0, preferably between about 2.0 and 4, and most preferably between about 2.0 and 3. The desired functionalities can be obtained by using mixtures of polyamines. For example, a functionality of 2.5 can be achieved by using equimolar mixtures of diamines and triamines. A functionality of 3.0 can be achieved either by using:

(1) triamines, (2) equimolar mixtures of diamines and tetramines, (3) mixtures of 1 and 2, or (4) any other suitable mixtures.

These other suitable mixtures for obtaining the desired functionalities will be readily apparent to those of ordinary skill in the art.

Suitable amines are essentially hydrocarbon polyamines containing 2 to 6 amine groups which have isocyanate-reactive hydrogens according to the Zerewitinoff test, e.g., primary or secondary amine groups. The polyamines are generally aromatic, aliphatic or alicyclic amines and contain between about 1 to 30 carbon atoms, preferably about 2 to 15 carbon atoms, and most preferably about 2 to 10 carbon atoms. These polyamines may contain additional substituents provided that they are not as reactive with isocyanate groups as the primary or secondary amines. Examples of polyamines for use in the present invention include the amines listed as low molecular compounds containing at least two isocyanate-reactive amino hydrogens, and also diethylene triamine, triethylene tetramine, tetraethylene pentamine, pentaethylene hexamine, N,N,N-tris-(2-aminoethyl)-amine, N-(2-piperazinoethyl)ethylene diamine, N,N'-bis-(2-aminoethyl)piperazine, N,N,N'-tris-(2-aminoethyl)-ethylene diamine, N-[N-(2-aminoethyl)-2-aminoethyl]-N'-(2-piperazinoethyl)-ethylene diamine, N-(2-aminoethylene-N'-(2-piperazinoethyl)amine, N,N-bis-(2-piperazinoethyl)-amine, polyethylene imines, iminobis amine, guanidine, melamine, N-(2-aminoethyl)-1,3-propane diamine, 3,3'diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)-ethylene diamine and 2,4-bis-(4'-aminobenzyl)-aniline. Preferred polyamines are 1-amino-3-aminomethyl-3,5,5-trimethyl-cyclohexane (isophorone diamine or IPDA), bis-(4-aminocyclohexyl)methane, bis-(4-amino-3-methylcyclohexyl)methane, 1,6-diaminohexane, ethylene diamine, diethylene triamine, triethylene tetramine, tetraethylene pentamine and pentaethylene hexamine.

The amount of polyfunctional amine to be used in accordance with the present invention is dependent upon the number of terminal isocyanate groups in the prepolymer. Generally, the ratio of terminal isocyanate groups of the prepolymer to the amino hydrogens of the polyfunctional amine is between about 1.0:0.6 and 1.0:1.1, preferably between about 1.0:0.8 and 1.0:0.98 on an equivalent basis. Lesser amounts of polyfunctional amine will allow for too much undesired reaction of the isocyanate groups with water, while an undue excess may lead to products with low molecular weight and less than the desired amount of cross-linking, when cross-linking is desired. For the purposes of these ratios, a primary amino group is considered to have one amino hydrogen. For example, ethylene diamine has two equivalents of amino hydrogens and diethylene triamine has three equivalents.

The reaction between the dispersed prepolymer and the polyamine is conducted at temperatures from about 5° to 90° C., preferably from about 20° to 80° C., and most preferably from about 30° to 60° C. The reaction conditions are normally maintained until the isocyanate groups are essentially completely reacted. In order to reduce the presence of localized concentration gradients, the polyamine is preferably added slowly or in increments to the dispersed prepolymer which is normally agitated to ensure complete mixing of the polyamine throughout the aqueous medium. The polyamine may be added to the aqueous medium in is pure form or it may be dissolved or dispersed in water or an organic solvent. Suitable organic solvents are those previously described for use in preparing the isocyanate-terminated prepolymer.

The final product is a stable, aqueous dispersion of colloidally-sized particles of urea-urethanes. The particle size is generally below about 1.0 micron, and preferably between about 0.001 to 0.5 micron. The average particle size should be less than about 0.5 micron, and preferably between 0.01 to 0.3 micron. The small particle size enhances the stability of the dispersed particles and also leads to the production of films with high surface gloss.

It is to be understood that the methods of preparing the polyurethane dispersions of the present invention are exemplary, and other methods known to those skilled in the art may be used as well without departing from the spirit of the invention. Suitable methods, for example, are disclosed in U.S. Pat. Nos. 4,408,008; 4,507,430; 3,479,310; 4,183,836; and 3,238,010, which are herein incorporated by reference.

Having generally described this invention, a further understanding can be obtained by reference to certain specific examples which are provided herein for purposes of illustration only and are not intended to be limiting unless otherwise specified.

EXAMPLE 1

4000 Da Polyoxypropylene Diol (Unsaturation =0.005 meq/g)

An isocyanate-terminated prepolymer was prepared using the following formulation:

| PREPOLYMER FORMULATION | | | |
|---|---|---|---|
| MATERIALS | Eq. Wt. | Equivalents | Weight (gs) |
| 4,4'-dicyclohexylmethane diisocyanate (Desmodur W) | 131.2 | 0.5354 | 70.24 |
| 4000 Da polyoxypropylene diol (unsat. = 0.005 meq/g, OH# 28.5) | 1968 | 0.0965 | 189.89 |
| dimethylolpropionic acid (DMPA) | 67.1 | 0.1466 | 9.84 |
| N-methyl-2-pyrrolidone (NMP) | | | 30.00 |
| stannous octoate | | | 0.03 |
| Total Prepolymer Weight (gs) | | | 300.00 |

The 4000 Da polyoxypropylene diol, DMPA, NMP and Desmodur W were charged to a 500 ml, 3-neck, round-bottom flask equipped with a thermocouple, stirrer and nitrogen inlet. While stirring, the mixture was heated to 80° C. until the DMPA solids dissolved and the mixture became homogeneous. The stannous octoate was then added and the temperature raised to 100° C. The components were reacted at 100° C. for 7 hours forming an isocyanate-terminated prepolymer with a calculated weight percent carboxylate content of 1.20 and an isocyanate (NCO) content of 3.81% (theoretical NCO =4.09%). The prepolymer was cooled to 80° C., then 5.98 g (0.059 equivalents) of triethylamine was added to neutralize the carboxylate groups and stirred for about 10 minutes. The prepolymer viscosity was 1020 cps at 80° C.

While stirring rapidly, 286 g of prepolymer at 80° C. was added slowly over a 5 minute period into a 500 ml resin flask containing 309.5 g of deionized water at 50° C.

An amine extender solution consisting of 6.88 g of ethylene diamine and 34.4 g of deionized water was added slowly over a 5 minute period. The resulting aqueous polyurethane/urea dispersion was heated at 50° C. for 2 hours to react off any remaining free isocyanate. The dispersion was stable with a total calculated solids content of 40.8% and a viscosity of 18 cps at 25° C.

Films were cast on glass plates using a 20 ml drawdown bar. The films were flashed off at room temperature and then heated to 80° C. for 1 hour. The resulting films were clear and flexible. The films were removed by immersing in water and then conditioned at least 2 weeks at 23° C. and 50% humidity prior to testing. The film properties are summarized in Tables 1 and 2.

EXAMPLE 2

4000 Da Polyoxypropylene Diol (Unsaturation =0.015 meq/g)

An isocyanate-terminated prepolymer was prepared using the following formulation:

| PREPOLYMER FORMULATION | | | |
|---|---|---|---|
| MATERIALS | Eq. Wt. | Equivalents | Weight (g) |
| 4,4'-dicyclohexylmethane diisocyanate (Desmodur W) | 131.2 | 0.5380 | 70.59 |
| 4000 Da polyoxypropylene diol (unsat. = 0.015 meq/g, OH# 28.7) | 1968 | 0.0969 | 189.50 |
| dimethylolpropionic acid (DMPA) | 67.1 | 0.1474 | 9.89 |
| N-methyl-2-pyrrolidone (NMP) | | | 30.00 |
| stannous octoate | | | 0.03 |
| Total Prepolymer Weight (g) | | | 300.01 |

The 4000 Da polyoxypropylene diol, DMPA, NMP and Desmodur W were charged to a 500 ml, 3-neck, round-bottom flask equipped with a thermocouple, stirrer and nitrogen inlet. While stirring, the mixture was heated to 80° C. until the DMPA solids dissolved and the mixture became homogeneous. The stannous octoate was then added and the temperature raised to 100° C. The components were reacted at 100° C. for 7 hours forming an isocyanate-terminated prepolymer with a calculated weight percent carboxylate content of 1.20 and an isocyanate (NCO) content of 3.88% (theoretical NCO =4.11%). The prepolymer was cooled to 80° C., then 6.01 g (0.059 equivalents) of triethylamine was added to neutralize the carboxylate groups and stirred for about 10 minutes.

While stirring rapidly, 284.6 g of prepolymer at 80° C. was added slowly over a 5 minute period into a 500 ml resin flask containing 308.0 g of deionized water at 50° C.

An amine extender solution consisting of 6.98 g of ethylene diamine and 34.9 g of deionized water was added slowly over a 5 minute period. The resulting aqueous polyurethane/urea dispersion was heated at 50° C. for 2 hours to react off any remaining free isocyanate. The dispersion was stable with a total calculated solids content of 40.7%.

Films were cast on glass plates using a 20 ml drawdown bar. The films were flashed off at room temperature and then heated to 80° C. for 1 hour. The resulting films were clear and flexible. The films were removed by immersing in water and then conditioned at least 2 weeks at 23° C. and 50% humidity prior to testing. The film properties are summarized in Table 1.

COMPARATIVE EXAMPLE A TO EXAMPLES 1 AND 2

4000 Da Polyoxlypropylene Diol (Unsaturation =0.085 meq))

| PREPOLYMER FORMULATION | | | |
|---|---|---|---|
| MATERIALS | Eq. Wt. | Equivalents | Weight (g) |
| 4,4'-dicyclohexylmethane diisocyanate (Desmodur W) | 131.2 | 0.5180 | 67.96 |
| 4000 Da polyoxypropylene diol (unsat. = 0.085 meq/g, OH# 27.2) | 2063 | 0.0933 | 192.49 |
| dimethylolpropionic acid (DMPA) | 67.1 | 0.1419 | 9.52 |
| N-methyl-2-pyrrolidone (NMP) | | | 30.00 |
| stannous octoate | | | 0.03 |
| Total Prepolymer Weight (g) | | | 300.00 |

The 4000 Da conventional polyoxypropylene diol, DMPA, NMP and Desmodur W were charged to a 500 ml, 3-neck, round-bottom flask equipped with a thermocouple, stirrer and nitrogen inlet. While stirring, the mixture was heated to 80° C. until the DMPA solids dissolved and the mixture became homogeneous. The stannous octoate was then added and the temperature raised to 100° C. The components were reacted at 100° C. for 8 hours forming an isocyanate-terminated prepolymer with a calculated weight percent carboxylate content of 1.16 and an isocyanate (NCO) content of 3.48% (theoretical NCO=5 3.96%). The prepolymer was cooled to 80° C., then 5.78 g (0.057 equivalents) of triethylamine was added to neutralize the carboxylate groups and stirred for about 10 minutes. The prepolymer viscosity was 940 cps at 80° C.

While stirring rapidly, 258.5 g of prepolymer at 80° C. was added slowly over a 5 minute period into a 500 ml resin flask containing 282.7 g of deionized water at 50° C.

An amine extender solution consisting of 5.67 g of ethylene diamine and 28.4 g of deionized water was added slowly over a 5 minute period. The resulting aqueous polyurethane/urea dispersion was heated at 50° C. for 2 hours to react off any remaining free isocyanate. The dispersion was stable with a total calculated solids content of 40.7% and a viscosity of 26 cps at 25° C.

Films were cast on glass plates using a 20 ml drawdown bar. The films were flashed off at room temperature and then-heated to 80° C. for 1 hour. The resulting films were slightly hazy. The films were removed by immersing in water and then conditioned at least 2 weeks at 23° C. and 50% humidity prior to testing. The film properties are summarized in Table 1.

TABLE 1

| FILM PROPERTIES | | | |
|---|---|---|---|
| | EXAMPLE 1 | EXAMPLE 2 | COMPARATIVE EXAMPLE 3 |
| Polyol Unsaturation, meg/g | 0.005 | 0.015 | 0.085 |
| Tensile Strength, psi | 3230 | 2950 | 1760 |
| 100% Modulus, psi | 1260 | 1090 | 950 |
| 300% Modulus, psi | 2300 | 1910 | 1690 |
| Ultimate Elongation, % | 430 | 460 | 320 |

As Table 1 illustrates, use of polyols having low unsaturation enables preparation of polyurethane lattices capable of forming films with vastly superior properties as compared to films formed from lattices employing conventional polyols. All physical properties are increased. The higher tensile strength and elongation are particularly important where films will be subject to stress. Furthermore, the films prepared from low unsaturation polyol-derived polyurethane dispersions were unexpectedly clear, while those prepared from similar formulations employing conventional polyols were hazy.

EXAMPLE 3

4000 Da Polyoxypropylene Diol (Unsaturated=0.005 meq/g) and Aliphatic Isocyanate An isocyanate-terminated prepolymer was prepared using the following formulation:

| PREPOLYMER FORMULATION | | | |
|---|---|---|---|
| MATERIALS | Eq. Wt. | Equivalents | Weight (g) |
| Isophorone diisocyanate (IPDI) | 111.1 | 0.5514 | 61.26 |
| 4000 Da polyoxypropylene diol (unsat. = 0.005 meq/g, OH# 28.1) | 1999 | 0.0994 | 198.58 |
| dimethylolpropionic acid (DMPA) | 67.1 | 0.1510 | 10.13 |
| N-methyl-2-pyrrolidone (NMP) | | | 30.00 |
| stannous octoate | | | 0.03 |
| Total Prepolymer Weight (g) | | | 300.00 |

The 4000 Da polyoxypropylene diol, DMPA, NMP and IPDI were charged to a 500 ml, 3-neck, round-bottom flask equipped with a thermocouple, stirrer and nitrogen inlet. While stirring, the mixture was heated to 80° C. until the DMPA solids dissolved and the mixture became homogeneous. The stannous octoate was then added and the temperature raised to 100° C. The components were reacted at 100° C. for 10 hours forming an isocyanate-terminated prepolymer with a calculated weight percent carboxylate content of 1.23 and an isocyanate (NCO) content of 4.05% (theoretical NCO =4.21%). The prepolymer was cooled to 80° C., then 6.16 g (0.060 equivalents) of triethylamine was added to neutralize the carboxylate groups and stirred for about 10 minutes. The prepolymer viscosity was 680 cps at 80° C.

While stirring rapidly, 258 g of prepolymer at 80° C. was added slowly over a 5 minute period into a 500 ml resin flask containing 278.9 g of deionized water at 50° C.

An amine extender solution consisting of 6.60 g of ethylene diamine and 33.0 g of deionized water was added slowly over a 5 minute period. The resulting aqueous polyurethane/urea dispersion was heated at 50° C. for 2 hours to react off any remaining free isocyanate. The dispersion was stable with a total calculated solids content of 40.7% and a viscosity of 35 cps at 25° C.

Films were cast on glass plates using a 20 ml drawdown bar. The films were flashed off at room temperature and then heated to 80° C. for 1 hour. The resulting films were clear and flexible. The films were removed by immersing in water and then conditioned at least 2 weeks at 23° C. and 50% humidity prior to testing. The film properties are summarized in Table 2.

TABLE 2

FILM PROPERTIES

|  | EXAMPLE 1 | EXAMPLE 3 |
|---|---|---|
| Diisocyanate | Desmodur W | IPDI |
| Tensile Strength, psi | 3230 | 4520 |
| 100% Modulus, psi | 1260 | 810 |
| 300% Modulus, psi | 2300 | 1540 |
| Ultimate Elongation, % | 430 | 670 |

EXAMPLE 4

2000 Da Polyoxypropylene Diol
(Unsaturation=0.005 meq)

An isocyanate-terminated prepolymer was prepared using the following formulation:

PREPOLYMER FORMULATION

| MATERIALS | Eq. Wt. | Equivalents | Weight (g) |
|---|---|---|---|
| Isophorone diisocyanate (IPDI) | 131.2 | 0.5614 | 62.37 |
| 2000 Da polyoxypropylene diol (unsat. = 0.005 meq/g, OH# 52.8) | 1062 | 0.1871 | 198.82 |
| dimethylolpropionic acid (DMPA) | 67.1 | 0.1310 | 8.79 |
| N-methyl-2-pyrrolidone (NMP) |  |  | 30.00 |
| stannous octoate |  |  | 0.03 |
| Total Prepolymer Weight (g) |  |  | 300.01 |

The 2000 Da polyoxypropylene diol, DMPA, NMP and IPDI were charged to a 500 ml, 3-neck, round-bottom flask equipped with a thermocouple, stirrer and nitrogen inlet. While stirring, the mixture was heated to 80° C. until the DMPA solids dissolved and the mixture became homogeneous. The stannous octoate was then added and the temperature raised to 100° C. The components were reacted at 100° C. for 10 hours forming an isocyanate-terminated prepolymer with a calculated weight percent carboxylate content of 0.99 and an isocyanate (NCO) content of 1.90% (theoretical NCO =2.01%). The prepolymer was cooled to 80° C., then 4.94 g (0.048 equivalents) of triethylamine was added to neutralize the carboxylate groups and stirred for about 10 minutes. The prepolymer viscosity was 1440 cps at 80° C.

While stirring rapidly, 250.5 g of prepolymer at 80° C. was added slowly over a 5 minute period into a 500 ml resin flask containing 292.9 g of deionized water at 50° C.

An amine extender solution consisting of 3.01 g of ethylene diamine and 15.1 g of deionized water was added slowly over a 5 minute period. The resulting aqueous polyurethane/urea dispersion was heated at 50° C. for 2 hours to react off any remaining free isocyanate. The dispersion was stable with a total calculated solids content of 40.0% and a viscosity of 46 cps at 25° C.

Films were cast on glass plates using a 20 ml drawdown bar. The films were flashed off at room temperature and then heated to 80° C. for 1 hour. The resulting films were clear and flexible. The films were removed by immersing in water and then conditioned at least 2 weeks at 23° C. and 50% humidity prior to testing. The film properties are summarized in Table 3.

COMPARATIVE EXAMPLE B TO EXAMPLE 4

2000 Da Polyoxypropylene Diol
(Unsaturation=0.030 meq/g))

PREPOLYMER FORMULATION

| MATERIALS | Eq. Wt. | Equivalents | Weight (g) |
|---|---|---|---|
| Isophorone diisocyanate (IPDI) | 131.2 | 0.5804 | 64.48 |
| 2000 Da polyoxypropylene diol (unsat. = 0.030 meq/g; OH# 55.2) |  | 0.1935 | 196.40 |
| dimethylolpropionic acid (DMPA) | 67.1 | 0.1354 | 9.09 |
| N-methyl-2-pyrrolidone (NMP) |  |  | 30.00 |
| stannous octoate |  |  | 0.03 |
| Total Prepolymer Weight (g) |  |  | 300.00 |

The 2000 Da polyoxypropylene diol, DMPA, NMP and IPDI were charged to a 500 ml, 3-neck, round-bottom flask equipped with a thermocouple, stirrer and nitrogen inlet. While stirring, the mixture was heated to 80° C. until the DMPA solids dissolved and the mixture became homogeneous. The stannous octoate was then added and the temperature raised to 100° C. The components were reacted at 100° C. for 10 hours forming an isocyanate terminated prepolymer with a calculated weight percent carboxylate content of 0.99 and an isocyanate (NCO) content of 1.90% (theoretical NCO =2.01%). The prepolymer was cooled to 80° C., then 4.94 g (0.048 equivalents) of triethylamine was added to neutralize the carboxylate groups and stirred for about 10 minutes. The prepolymer viscosity was 1440 cps at 80° C.

While stirring rapidly, 250.5 g of prepolymer at 80° C. was added slowly over a 5 minute period into a 500 ml resin flask containing 292.9 g of deionized water at 50° C.

An amine extender solution consisting of 3.01 g of ethylene diamine and 15.1 g of deionized water was added slowly over a 5 minute period. The resulting aqueous polyurethane/urea dispersion was heated at 50° C. for 2 hours to react off any remaining free isocyanate. The dispersion was stable with a total calculated solids content of 40.0% and a viscosity of 64 cps at 25° C.

Films were cast on glass plates using a 20 ml drawdown bar. The films were flashed off at room temperature and then heated to 80° C. for 1 hour. The resulting films were clear and flexible. The films were removed by immersing in water and then conditioned at least 2 weeks at 23° C. and 50% humidity prior to testing. The film properties are summarized in Table 3.

TABLE 3

FILM PROPERTIES

|  | EXAMPLE 4 | COMPARATIVE EXAMPLE B |
|---|---|---|
| Polyol Unsaturation, meq/g | 0.005 | 0.030 |
| Tensile Strength, psi | 5930 | 4380 |
| 100% Modulus, psi | 510 | 570 |
| 300% Modulus, psi | 1090 | 1160 |
| Ultimate Elongation, % | 670 | 640 |

Table 3 illustrates that the use of low unsaturation polyols in conjunction with isophoronediisocyanate to prepare polyurethane dispersions enables the production of softer films which unexpectedly offer higher tensile strength and elongation as compared to films prepared from similar dispersions derived from conventional polyols.

EXAMPLE 5 (HIGH HARDNESS FILM)

An isocyanate-terminated prepolymer was prepared using the following formulation:

PREPOLYMER FORMULATION

| MATERIALS | Eq. Wt. | Equivalents | Weight (g) |
|---|---|---|---|
| 4,4'-dicyclohexylmethane diisocyanate (Desmodur W) | 131.2 | 0.8819 | 115.70 |
| 2000 Da polyoxypropylene diol (unsat. = 0.005 meq/g, OH# 55.1) | 1018 | 0.1102 | 112.22 |
| neopentyl glycol (NPG) | 52.0 | 0.3307 | 17.20 |
| dimethylolpropionic acid (DMPA) | 67.1 | 0.1469 | 9.86 |
| N-methyl-2-pyrrolidone (NMP) | | | 45.00 |
| stannous octoate | | | 0.03 |
| Total Prepolymer Weight (g) | | | 300.01 |

The 2000 Da polyoxypropylene diol, NPG, DMPA, NMP and Desmodur W were charged to a 500 ml, 3-neck, round-bottom flask equipped with a thermocouple, stirrer and nitrogen inlet. While stirring, the mixture was heated to 80° C. until the DMPA solids dissolved and the mixture became homogeneous. The stannous octoate was then added and the temperature raised to 100° C. The components were reacted at 100° C. for 13 hours forming an isocyanate-terminated prepolymer with a calculated weight percent carboxylate content of 1.27 and an isocyanate (NCO) content of 3.69% (theoretical NCO=4.12%). The prepolymer was cooled to 80° C., then 5.99 g (0.059 equivalents) of triethylamine was added to neutralize the carboxylate groups and stirred for about 10 minutes.

While stirring rapidly, 261.4 g of prepolymer at 80° C. was added slowly over a 5 minute period into a 500 ml resin flask containing 258.6 g of deionized water at 50° C.

An amine extender solution consisting of 6.08 g of ethylene diamine and 30.4 g of deionized water was added slowly over a 5 minute period. The resulting aqueous polyurethane/urea dispersion was heated at 50° C. for 2 hours to react off any remaining free isocyanate. The dispersion was stable with a total calculated solids content of 39.1% and a viscosity of 1450 cps at 25° C.

Films were cast on glass plates using a 20 ml drawdown bar. The films were flashed off at room temperature and then heated to 80° C. for 1 hour. The resulting films were clear and flexible. The films were removed by immersing in water and then conditioned at least 2 weeks at 23° C. and 50% humidity prior to testing. The film properties are summarized below.

| | EXAMPLE 5 |
|---|---|
| Pencil Hardness | H |
| Tensile Strength, psi | 6410 |
| 100% Modulus, psi | 3460 |
| Ultimate Elongation, % | 250 |

EXAMPLE 6

An isocyanate-terminated prepolymer was prepared using the following formulation:

PREPOLYMER FORMULATION

| MATERIALS | Equivalents | Weight (g) |
|---|---|---|
| 4,4'-dicyclohexylmethane diisocyanate (Desmodur W) | 0.5081 | 66.67 |
| 2000 Da polyoxypropylene diol (unsat. = 0.005 meq/g, OH# 52.8) | 0.1954 | 195.44 |
| dimethylolpropionic acid (DMPA) | 0.1173 | 7.87 |
| N-methyl-2-pyrrolidone (NMP) | | 30.00 |
| stannous octoate | | 0.03 |
| Total Prepolymer Weight (g) | | 300.01 |

The 2000 Da polyoxypropylene diol, DMPA, NMP and Desmodur W were charged to a 500 ml, 3-neck, round-bottom flask equipped with a thermocouple, stirrer and nitrogen inlet. While stirring, the mixture was heated to 80° C. until the DMPA solids dissolved and the mixture became homogeneous. The stannous octoate was then added and the temperature raised to 100° C. The components were reacted at 100° C. for 7 hours forming an isocyanate terminated prepolymer with a calculated weight percent carboxylate content of 0.96 and an isocyanate (NCO) content of 2.74%. The prepolymer was cooled to 80° C., then sufficient of triethylamine was added to neutralize 80 percent of the carboxylate groups and stirred for about 10 minutes. The prepolymer viscosity was 1350 cps at 80° C.

While stirring rapidly, the prepolymer at 80° C. was added slowly over a 5 minute period into a 500 ml resin flask containing deionized water at 50° C.

An amine extender solution consisting of ethylene diamine in deionized water was added slowly over a 5 minute period in an amount sufficient to react to react with 90 percent of the remaining isocyanate groups. The resulting aqueous polyurethane/urea dispersion was heated at 50° C. for 2 hours to react off any remaining free isocyanate. The dispersion was stable with a total calculated solids content of c.a. 40%.

Films were cast on glass plates using a 20 ml drawdown bar. The films were flashed off at room temperature and then heated to 80° C. for 1 hour. The resulting films were clear and flexible. The films were removed by immersing in water and then conditioned at least 2 weeks at 23° C. and 50% humidity prior to testing.

COMPARATIVE EXAMPLE C TO EXAMPLE 6

An isocyanate-terminated prepolymer was prepared using the following formulation:

PREPOLYMER FORMULATION

| MATERIALS | Equivalents | Weight (g) |
|---|---|---|
| 4,4'-dicyclohexylmethane diisocyanate (Desmodur W) | 0.4996 | 65.54 |
| 2000 Da polytetramethylene ether glycol (PTMEG) | 0.1921 | 196.70 |
| dimethylolpropionic acid (DMPA) | 0.1153 | 7.74 |
| N-methyl-2-pyrrolidone (NMP) | | 30.00 |
| stannous octoate | | 0.03 |
| Total Prepolymer Weight (g) | | 300.00 |

The 2000 Da PTMEG, DMPA, NMP and Desmodur W were charged to a 500 ml, 3-neck, round-bottom flask equipped with a thermocouple, stirrer and nitrogen inlet. While stirring, the mixture was heated to 80° C. until the DMPA solids dissolved and the mixture became homogeneous. The stannous octoate was then added and the temperature raised to 100° C. The components were reacted at 100° C. for 7 hours forming an isocyanate terminated prepolymer with a calculated weight percent carboxylate content of 0.94 and an isocyanate (NCO) content of 2.69%. The prepolymer was cooled to 80° C., then sufficient triethylamine was added to neutralize 80% of the carboxylate groups and stirred for about 10 minutes. The prepolymer viscosity was 9100 cps at 80° C.

While stirring rapidly, the prepolymer at 80° C. was added slowly over a 5 minute period into a 500 ml resin flask containing deionized water at 50° C.

An amine extender solution consisting of ethylene diamine and deionized water was added slowly over a 5 minute period in an amount sufficient to react with 90% of the remaining isocyanate groups. The resulting aqueous polyurethane/urea dispersion was heated at 50° C. for 2 hours to react off any remaining free isocyanate. The dispersion was stable with a total calculated solids content of c.a. 40%.

Films were cast on glass plates using a 20 ml drawdown bar. The films were flashed off at room temperature and then heated to 80° C. for 1 hour. The resulting films were clear and flexible. The films were removed by immersing in water and then conditioned at least 2 weeks at 23° C. and 50% humidity prior to testing.

Figure 1:
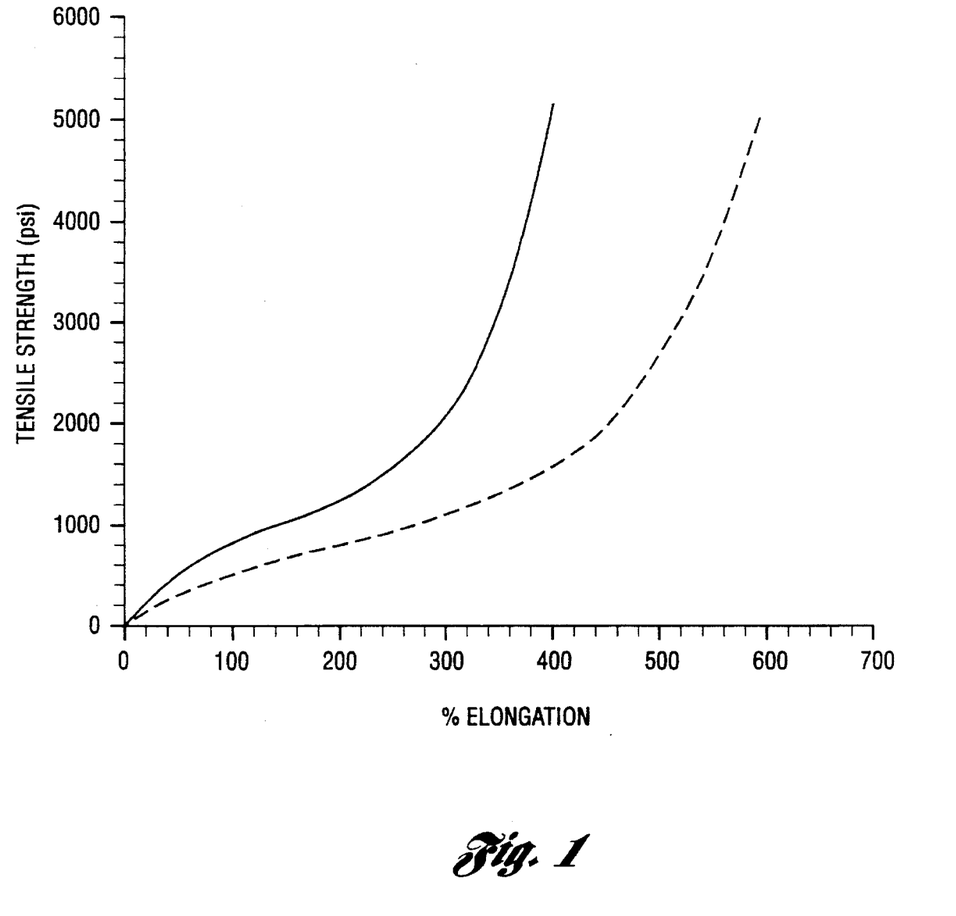
FIG. 1 is a plot of percent elongation versus tensile strength for a film prepared from a polyurethane latex of the subject invention and a film prepared from a polyurethane latex containing a PTMEG-derived polymer.

The film prepared from PTMEG in the Comparative Example is decidedly harder than the film prepared from the low unsaturation polyoxypropylene diol in Example 6, as can be demonstrated with respect to FIG. 1, where the solid curve is the tensile strength versus elongation of the PTMEG-derived film of Comparative Example C and the dashed curve the same plot for the low unsaturation polyoxypropylene diol film. As can be seen, the latter has a considerably lower modulus at 100% elongation than the PTMEG derived film. Moreover, the PTMEG-derived film of Comparative Example C is actually considerably softer than what can be used commercially, as the upper processing limit on prepolymer viscosity is 5000 cps at 80° C, while the laboratory prepared PTMEG-derived prepolymer of Comparative Example C had a viscosity of 9100 cps at 80° C. Under the same conditions, the prepolymer of Example 6 had a viscosity of only 1350 cps. It should be noted that the polyurethanes of Example 6 and Comparative Example C had virtually the same hard segment content, 29.0 and 28.4 weight percent, respectively.

Having now fully described the invention, it will be apparent to one of ordinary skill in the art that many changes and modifications can be made thereto without departing from the spirit or scope of the invention as set forth herein.

What is claimed is:

1. An aqueous polyurethane dispersion wherein the polyurethane dispersed phase comprises the reaction product of:
   a) an aqueous dispersion of an isocyanate-terminated polyurethane prepolymer having an isocyanate group content of from 1 to about 8 percent by weight relative to said isocyanate-terminated polyurethane prepolymer, prepared by reacting:
      i) an organic di- or polyisocyanate,
      ii) a polyol component, and
      iii) a dispersing aid component, wherein said polyol component comprises, in major part, one or more polyoxypropylene diols, said one or more polyoxypropylene diols having a number average unsaturation of less than 0.020 meq/g and a number average equivalent weight of from about 1000 Da to about 8000 Da; with
   b) a chain extender reactive with said isocyanate-terminated prepolymer.

2. The dispersion of claim 1 wherein said polyol component comprises minimally 80 weight percent of one or more polyoxypropylene diols having an unsaturation of 0.020 meq/g or less.

3. The dispersion of claim 1 wherein said one or more polyoxyalkylene diols have an unsaturation of 0.010 meq/g or less.

4. The dispersion of claim 1 wherein said polyoxypropylene diol has a number average equivalent weight of from 1000 Da to about 3000 Da.

5. The dispersion of claim 1 wherein said polyoxypropylene diol has a number average equivalent weight of from 1000 Da to about 2000 Da.

6. The dispersion of claim 1 wherein said one or more polyoxyalkylene diols have an unsaturation of 0.007 meq/g or less.

7. The dispersion of claim 1 wherein said dispersing aid component comprises a hydroxyalkanoic acid.

8. The dispersion of claim 7 wherein said hydroxyalkanoic acid is an $\alpha,\alpha$-dimethylolalkanoic acid.

9. The dispersion of claim 7 wherein prior to reaction of said prepolymer (a) with said chain extender (b), at least a portion of carboxylic acid groups derived from said hydroxyalkanoic acid are neutralized with a neutralizing agent effective to neutralize said portion of carboxylic acid groups to carboxylate groups.

10. The dispersion of claim 9 wherein said neutralizing agent comprises a tertiary organic amine.

11. The dispersion of claim 1 wherein said chain extender is an organic di- or polyamine.

12. The dispersion of claim 11 wherein said di- or polyamine comprises an alkylenediamine.

13. The dispersion of claim 1 wherein said polyol component further comprises up to about 10 equivalent percent, based on polyol component equivalents, of a polyoxyalkylene polyol having a functionality greater than 2 and a number average equivalent weight of from about 1000 Da to 3000 Da, said polyol component having an average unsaturation of less than 0.02 meg/g.

14. An isocyanate-terminated polyurethane prepolymer comprising the reaction product of:
   a) a di- or polyisocyanate in an amount sufficient to provide an NCO group content in said prepolymer of from about 1 to about 8 weight percent based on the weight of said prepolymer;
   b) a polyol component comprising, in major part, one or more polyoxypropylene diols having a number average equivalent weight of from 1000 Da to about 8000 Da and an unsaturation of 0.020 meq/g or less; and
   c) an isocyanate-reactive dispersing aid component containing one or more dispersing aids containing dispersing groups selected from the group consisting of ionic groups, latent ionic groups, and non-ionic hydrophilic groups.

15. The prepolymer of claim 14 wherein said dispersing group is a carboxylate group or a carboxylic acid group present in an amount of from about 0.1 weight percent to about 5 weight percent based on the weight of the prepolymer.

16. The prepolymer of claim 14 wherein said polyol component comprises minimally 80 weight percent of one or more polyoxypropylene polyols having an unsaturation of 0.020 or less.

17. The prepolymer of claim 16 wherein said one or more polyoxypropylene polyols have an unsaturation of 0.010 meq/g or less.

18. A polyurethane film comprising the dried aqueous dispersion of claim 1.

19. A polyurethane film comprising the dried aqueous dispersion of claim 3.

20. A polyurethane film comprising the dried aqueous dispersion of claim 7.

* * * * *